(12) United States Patent
Schmidt et al.

(10) Patent No.: US 11,379,404 B2
(45) Date of Patent: Jul. 5, 2022

(54) REMOTE MEMORY MANAGEMENT

(71) Applicant: SAP SE, Walldorf (DE)

(72) Inventors: Oliver Schmidt, Walldorf (DE); Andreas Ludwig Erz, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/224,151

(22) Filed: Dec. 18, 2018

(65) Prior Publication Data
US 2020/0192857 A1 Jun. 18, 2020

(51) Int. Cl.
| G06F 15/173 | (2006.01) |
| G06F 13/28 | (2006.01) |
| G06F 13/16 | (2006.01) |
| H04L 49/90 | (2022.01) |
| H04L 49/356 | (2022.01) |
| H04L 49/00 | (2022.01) |
| H04L 47/30 | (2022.01) |

(52) U.S. Cl.
CPC .... *G06F 15/17331* (2013.01); *G06F 13/1673* (2013.01); *G06F 13/28* (2013.01); *H04L 47/30* (2013.01); *H04L 49/3018* (2013.01); *H04L 49/3027* (2013.01); *H04L 49/358* (2013.01); *H04L 49/9084* (2013.01)

(58) Field of Classification Search
CPC .......... G06F 15/17331; G06F 13/1673; G06F 13/28; H04L 47/30; H04L 49/3018; H04L 49/3027; H04L 49/358; H04L 49/9084
See application file for complete search history.

(56) References Cited

U.S. PATENT DOCUMENTS

| 5,860,149 A * | 1/1999 | Fiacco .................... G06F 5/06 711/209 |
| 6,421,745 B1 * | 7/2002 | James .................. H04L 47/266 709/200 |
| 7,930,422 B2 * | 4/2011 | Freimuth ............... G06F 13/30 709/234 |

(Continued)

OTHER PUBLICATIONS

Lu et al., Octopus: an RDMA-enabled Distributed Persistent Memory File System, 2017, USENIX (Year: 2017).*

*Primary Examiner* — William G Trost, IV
*Assistant Examiner* — Abdelbasst Talioua
(74) *Attorney, Agent, or Firm* — Mintz Levin Cohn Ferris Glovsky and Popeo, P.C.

(57) ABSTRACT

Remote memory management of the memory of a consumer computer by a producer computer is described. A system is described that can include a first computer, and a second computer communicatively coupled to the first computer via a remote direct memory access enabled communication network. The first computer can include a first operating system. The second computer can include a second operating system and a second memory. The second memory can include a plurality of buffers. The first computer can remotely manage the plurality of buffers of the second memory of the second computer without involving either the first operating system or the second operating system. The managing can further include the first computer identifying available buffers amongst the plurality of buffers. Related methods, apparatuses, articles, non-transitory computer program products, non-transitory computer readable media are also within the scope of this disclosure.

11 Claims, 4 Drawing Sheets

(56) References Cited

U.S. PATENT DOCUMENTS

| | | | |
|---|---|---|---|
| 9,794,366 B1* | 10/2017 | Pabon | H04L 67/1097 |
| 10,509,764 B1* | 12/2019 | Izenberg | H04L 69/22 |
| 10,523,675 B2* | 12/2019 | Bhabbur | H04L 63/123 |
| 2006/0056405 A1* | 3/2006 | Chang | H04L 69/326 |
| | | | 370/389 |
| 2007/0162559 A1* | 7/2007 | Biswas | H04L 47/10 |
| | | | 709/216 |
| 2010/0082766 A1* | 4/2010 | Dreier | H04L 69/324 |
| | | | 709/216 |
| 2012/0030451 A1* | 2/2012 | Pong | G06F 9/30043 |
| | | | 712/E9.016 |
| 2012/0311208 A1* | 12/2012 | Manula | G06F 13/364 |
| | | | 710/108 |
| 2013/0054858 A1* | 2/2013 | Bugge | G06F 13/24 |
| | | | 710/263 |
| 2013/0103777 A1* | 4/2013 | Kagan | H04L 49/901 |
| | | | 709/212 |
| 2013/0275835 A1* | 10/2013 | Aswadhati | G06F 13/4022 |
| | | | 714/773 |
| 2014/0207896 A1* | 7/2014 | Hefty | H04L 12/06 |
| | | | 709/212 |
| 2015/0172226 A1* | 6/2015 | Borshteen | H04L 49/9057 |
| | | | 370/412 |
| 2015/0326661 A1* | 11/2015 | Nakamura | H04L 49/358 |
| | | | 709/202 |
| 2016/0062954 A1* | 3/2016 | Ruff | G06F 8/41 |
| | | | 715/249 |
| 2017/0083326 A1* | 3/2017 | Burger | G06F 9/345 |
| 2017/0277655 A1* | 9/2017 | Das | G06F 3/0631 |
| 2017/0336980 A1* | 11/2017 | Kurt | G06F 3/064 |
| 2017/0346899 A1* | 11/2017 | Joshi | G06F 13/28 |
| 2018/0285074 A1* | 10/2018 | Shergill | G06F 3/061 |
| 2018/0302469 A1* | 10/2018 | Yang | H04L 67/2842 |
| 2020/0042475 A1* | 2/2020 | Venkataramani | G06F 13/28 |
| 2020/0322466 A1* | 10/2020 | Yang | H04L 1/08 |

\* cited by examiner

REMOTE MEMORY MANAGEMENT

TECHNICAL FIELD

The subject matter described herein relates to remote memory management amongst at least two computers connected via a remote direct memory access (RDMA)—enabled communication network.

BACKGROUND

A remote direct memory access (RDMA) support can be implemented using the InfiniBand Verbs application programming interface (API). The endpoints of an RDMA connection are called queue pairs. Each queue pair is made up of two queues, a send queue and a receive queue. A transfer is executed by posting a work request to the send queue. For a two-sided communication to succeed between two computers, one computer must have produced data it wants to transfer, and the other computer must have posted a corresponding work request to receive its queue; otherwise the communication will fail. In addition to the send and receive queues, the RDMA connection has a third type of queue, which is referred to as the completion queue. The RDMA layer uses the completion queue to notify an application on a computer about the completion of a work request. RDMA supports natively working with multiple scatter/gather entries—i.e., reading multiple memory buffers and sending them as one stream or getting one stream and writing it to multiple memory buffers. Conventional communication does not permit transferring messages of arbitrary size without increasing/worsening latency.

SUMMARY

The subject matter described herein relates to remote memory management of the memory of a consumer computer by a producer computer that is communicatively connected to the consumer computer via a remote direct memory access (RDMA)—enabled communication network.

In one aspect, remote memory management of the memory of a consumer computer by a producer computer is described. A system is described that can include a first computer, and a second computer communicatively coupled to the first computer via a remote direct memory access enabled communication network. The first computer can include a first operating system. The second computer can include a second operating system and a second memory. The second memory can include a plurality of buffers. The first computer can remotely manage the plurality of buffers of the second memory of the second computer without involving either the first operating system or the second operating system. The managing can further include the first computer identifying available buffers amongst the plurality of buffers.

In some variations one or more of the following features can optionally be included in any feasible combination. The first computer can include a first network interface card. The second computer can include a second network interface card. The first computer can communicate with the second computer via the first network interface card and the second interface card. The first network interface card can communicate with the second network interface card via the communication network. The second computer can be configured to register the plurality of buffers on behalf of the first computer. The second computer can be configured to transmit to the first computer data specifying whether a buffer of the plurality of buffers is available to be written in. The identification of the plurality of available buffers can include determining whether the buffer is available to be written in. The first computer and the second computer can be configured to prevent an overflow in a communication queue of a connection between the first computer and the second computer. The first computer can include a first memory. The first memory can include another plurality of buffers. The second computer can remotely manage the other plurality of buffers without involving either the first operating system or the second operating system. The remote management by the second computer can include the second computer identifying another plurality of available buffers amongst the other plurality of buffers.

Related apparatuses, systems, methods, techniques and articles are also described and within the scope of this disclosure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to InfiniBand architecture, it should be readily understood that such features are not intended to be limiting. The claims that follow this disclosure are intended to define the scope of the protected subject matter.

The details of one or more variations of the subject matter described herein are set forth in the accompanying drawings and the description below. Other features and advantages of the subject matter described herein will be apparent from the description, the drawings, and the claims.

BRIEF DESCRIPTION OF DRAWINGS

Like reference numerals in various drawings indicate like elements.

DETAILED DESCRIPTION

Figure 1:
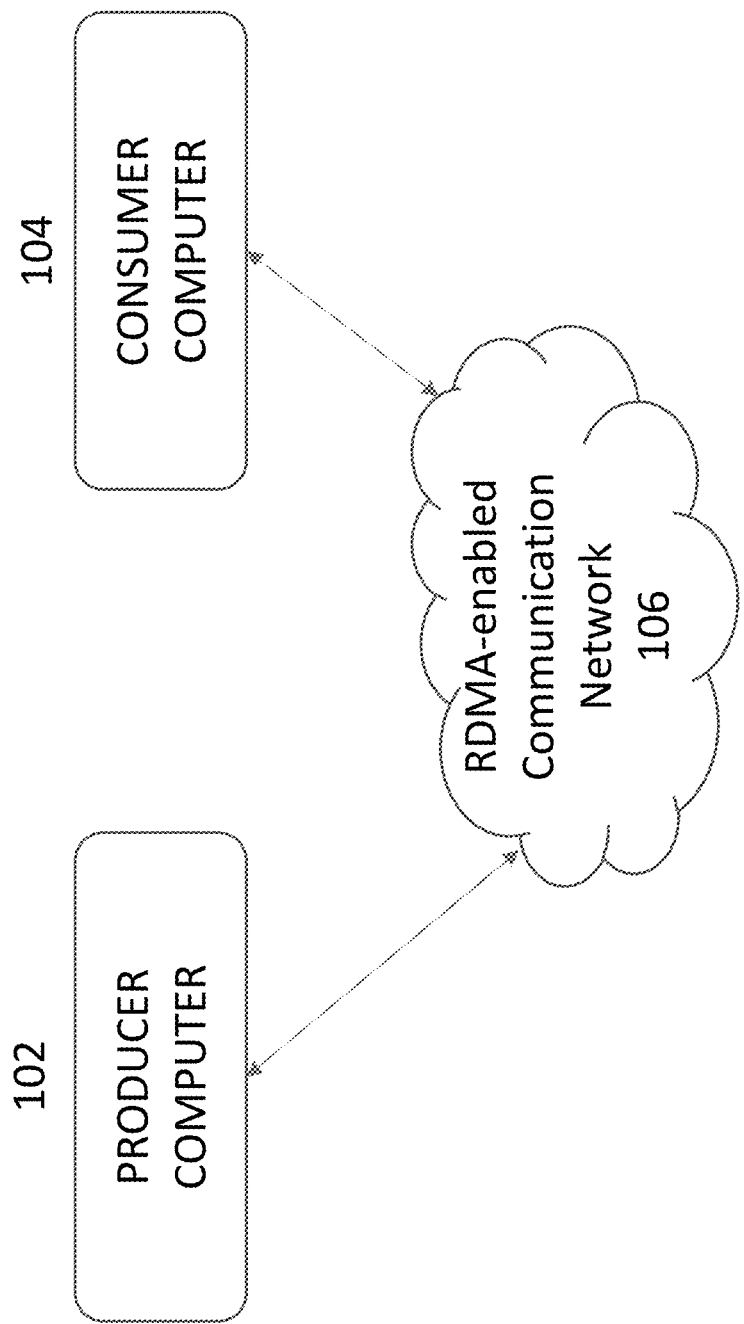
FIG. 1 illustrate a producer computer communicatively coupled to a consumer computer via a remote direct memory access (RDMA)—enabled communication network, in accordance with some implementations of the subject matter described herein.

FIG. 1 illustrate a producer computer 102 communicatively coupled to a consumer computer 104 via a remote direct memory access (RDMA)—enabled communication network 106. RDMA programs that are not built around the RDMA one-sided communication usually use the InfiniBand Verb SEND. The InfiniBand Verb SEND is also simply referred to as SEND herein. The InfiniB and Verb SEND requires the consumer of data—i.e., the consumer computer 104—to decide where to place the data in the consumer computer 104's RDMA buffers. However, such configuration may make it virtually impossible to work with different message sizes because the consumer computer 104 needs to place a work request in its receive queue with a reasonably sized buffer before the SEND work request is queued.

Fortunately, however, RDMA has an additional InfiniB and Verb WRITE_WITH_IMM. The InfiniB and Verb WRITE_WITH_IMM is also simply referred to as WRITE_WITH_IMM herein. In contrast to the InfiniBand Verb WRITE, and in common with SEND, WRITE_WITH_IMM performs a two-sided communication, meaning that the consumer of data is notified of the completion of the work request. The InfiniBand Verb WRITE is also simply referred to as WRITE herein. But in contrast to SEND, and in common with WRITE, the producer of data—i.e., producer computer 102—decides where to place it in the buffers of the consumer computer 104. This allows the producer computer 102 to send messages of any size desired. The name WRITE_WITH_IMM refers to a 32 bit immediate "user" value that is part of the work request at the side of the producer computer 102 and becomes part of the completion notification on the side of the consumer computer 104. However, using WRITE_WITH_IMM instead of SEND poses two problems—first, the producer computer 102 needs to know which RDMA buffers of the consumer computer 104 are currently free to be used; and second, the producer computer 102 needs to inform the consumer computer 104 about which RDMA buffer of the consumer computer 104 the producer computer 102 actually used. The implementations described herein solve these problems as follows.

The first problem is solved by moving the management of the RDMA buffers of the consumer computer 104 completely to the producer computer 102. The consumer computer 104 registers the RDMA buffers on behalf of the producer computer 102 and informs the producer computer 102 about the metadata that the producer computer 102 needs to write to them via WRITE_WITH_IMM. And as soon as the consumer computer 104 is done with using a buffer, it again informs the producer computer 102 that the buffer is available for writing again. This way the producer computer 102 has at any time a consistent understanding of the RDMA buffers currently free to be used for WRITE_WITH_IMM. It is up to the producer computer 102 to take care of buffer management aspects like avoiding fragmentation.

The second problem is solved by using the immediate value of WRITE_WITH_IMM as index into the RDMA header buffers. A typical user message consists of three parts: (1) the 32 bit immediate value (write index), (2) a header, and (3) a payload.

Figure 2:
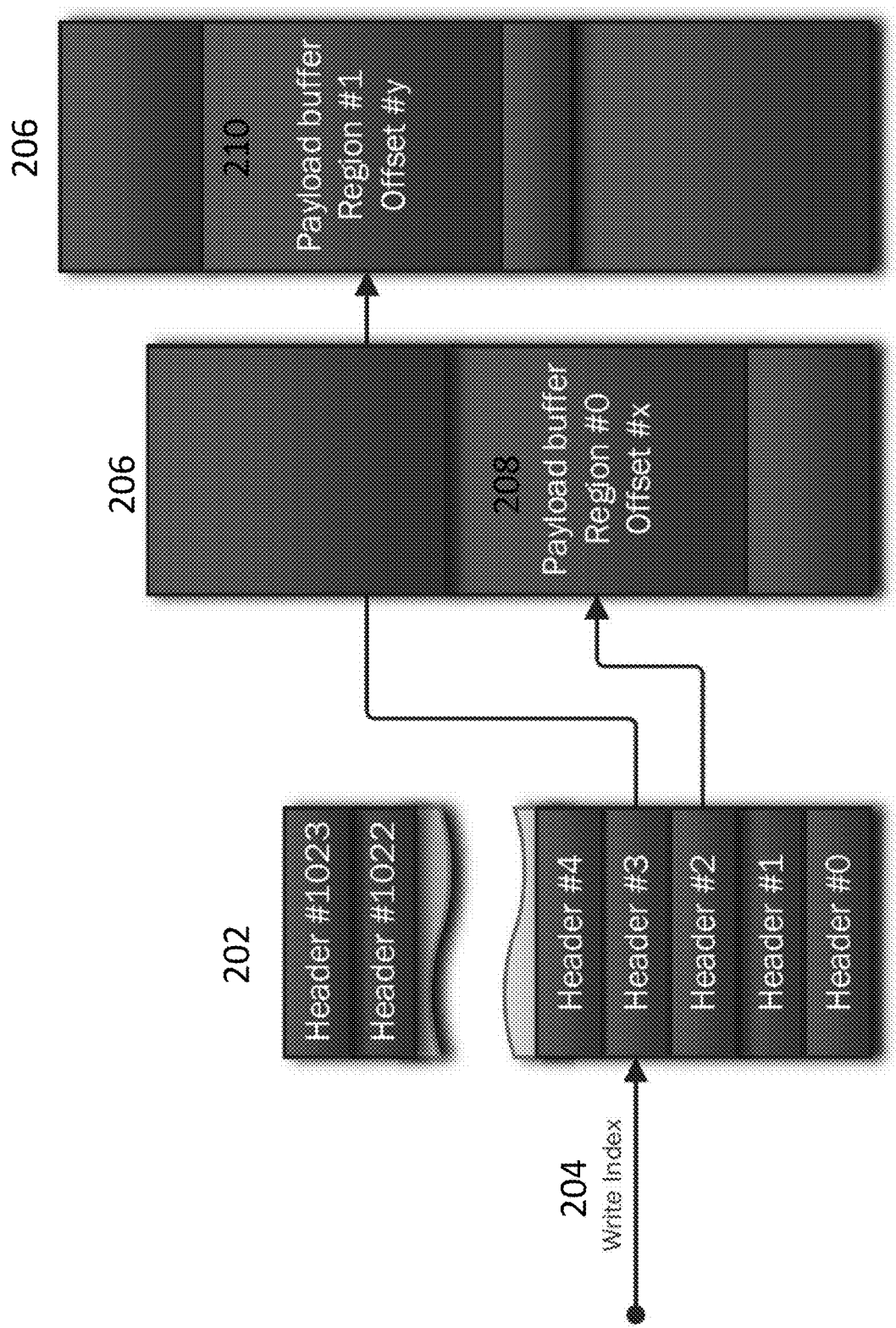
FIG. 2 illustrates a RDMA buffer created by the consumer computer, and the technical relationships of such buffer, in accordance with some implementations of the subject matter described herein.

The header can have a fixed size of, for example, 1 kilobyte. The header can contain, for example, certain attributes of the user message. The consumer computer 104 creates a RDMA buffer that can, for example, have 1 megabyte size and hold 1024 headers. FIG. 2 illustrates a RDMA buffer 202 created by the consumer computer 104, and relationships of this buffer 202. The 32 bit immediate value of the user message holds an index 204—which can have a value between 0 and 1023—into the RDMA buffer 202. The index 204 can indicate the specific header buffer (here, for example, Header #3), of the consumer 104, that is used for the user message. The header buffer 202 contains the metadata identifying the consumer computer 104's payload buffer 206 holding the actual user content. This metadata can include a location identifier (e.g., virtual address) of the memory region containing the payload buffer 206 and an offset into that memory region. The memory region and offset are collectively referred to using reference numerals 208 and 210.

A normal user message is sent using two RDMA messages—the first message is sent via WRITE and refers to the payload buffer 208 or 210, and the second message is sent via WRITE_WITH_IMM and refers to the header buffer 202. The producer computer 102 uses the metadata—i.e., virtual address and offset—of the consumer computer 104's payload buffer 208 or 210 in two places: (1) as scatter/gather entry used to send the payload buffer 206 to the consumer computer 104 via WRITE, and (2) as content of the header buffer 202 to have the consumer computer 104 find the payload buffer 208 or 210 received.

Besides those normal user messages transporting payload, there are also short user messages such as short messages for setting up and tearing down user connections. Such a short message is sent using only one RDMA message. This message is sent via WRITE_WITH_IMM and refers to the header buffer 202. The header of such a short user message may not refer to any payload and accordingly may not contain any metadata to reference a payload buffer.

Small user messages with a payload of up to, for example, 256 or 512 bytes, are sent as a short user message consisting of a single RDMA message. The payload content is copied into the header buffer 202.

Figure 3:
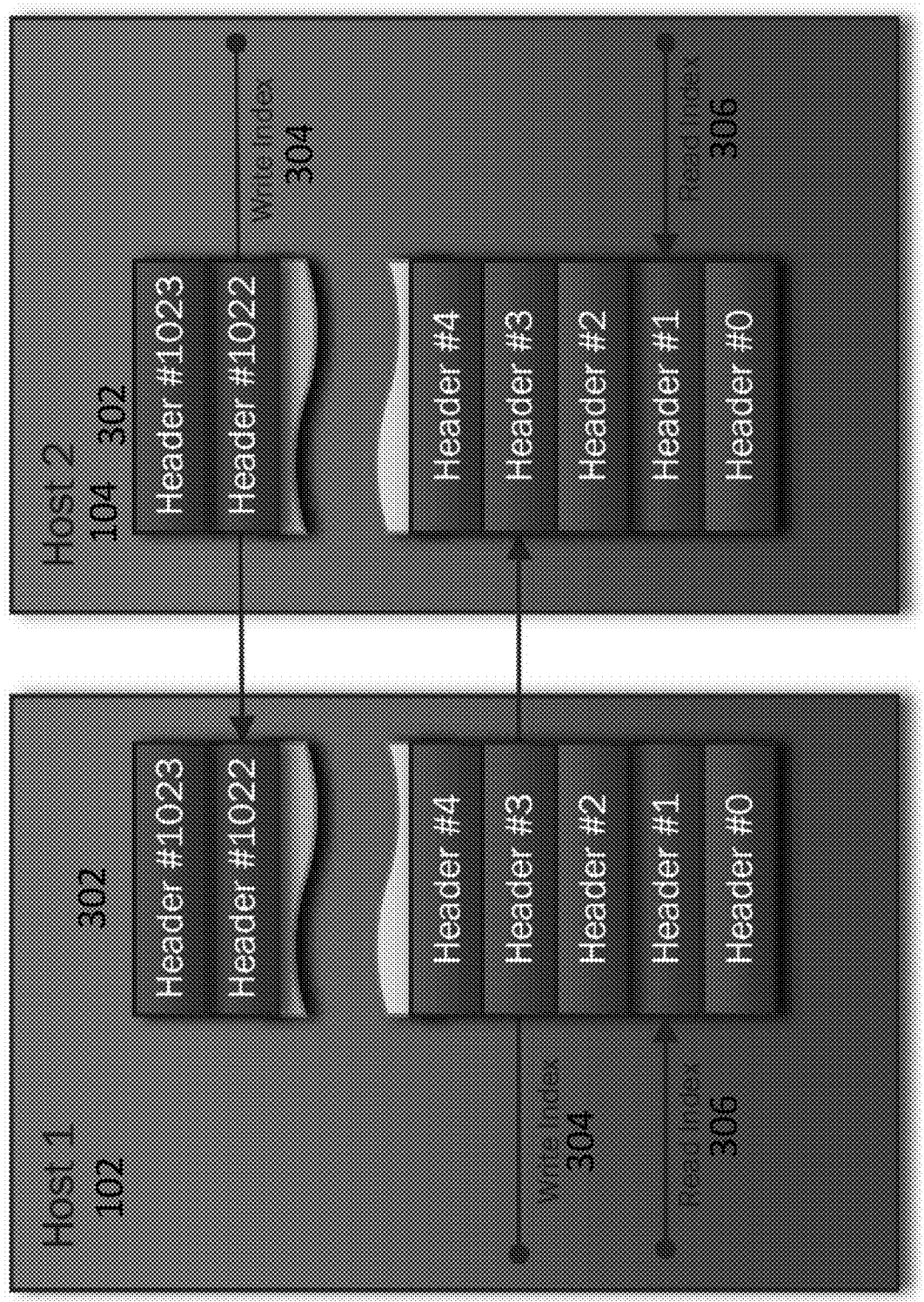
FIG. 3 illustrates flow control using header buffers, in accordance with some implementations of the subject matter described herein.

FIG. 3 illustrates flow control using header buffers. The flow control ensures that the completion queue—of the RDMA connection between the producer computer 102 and consumer computer 104—does not overflow. The thread processing the completion events on the consumer computer 104 is supposed to not block on any operation besides waiting for new completion events. But if, for example, due to a general machine overload situation such thread just doesn't get scheduled often enough, that thread can still fall behind processing the messages sent by the producer computer 102. Without any precaution, such falling behind of the processing can result in an overflow of the completion queue, which can be technologically fatal. Therefore, the producer computer 102 needs to know when to stop sending new messages.

Beside that technological RDMA limitation, there's another specific limitation—the header buffers. As described above, the producer computer 102 uses the header buffers 302 in a sequential order as a ring buffer. If the consumer thread is not able to process the header buffers 302 quickly enough, the producer computer 102 may have wrapped around already and use a header buffer 302 again before it is processed by the consumer computer 104.

As the header buffer write index 304 used by the producer computer 102 is already sent to the consumer computer 104, it makes sense to send the header buffer read index 306 processed by the consumer computer 104 back to the producer computer 102. The producer computer 102 blocks on sending another message to the consumer computer 104 if that would mean using a header buffer 302 not yet signaled as processed by the consumer computer 104. If it can be ensured that there are more entries in the completion queue than there are header buffers, this can implicitly ensure that the completion queue does not overflow.

To keep the overhead for that channel flow control low, the system described herein uses a third type of user message beside the two regular RDMA messages along with the short regular messages including one RDMA message. Here, the only data to be sent from the consumer computer 104 to the producer computer 102 is the index (0-1023) of the header buffer 302 processed last. This data is sent as 32 bit immediate value of a WRITE_WITH_IMM without any scatter/gather entry so header buffer 302 of the consumer computer 104 is not used.

The implementations described above describe one computer 102 as producer and the other computer 104 as consumer. However, in many implementations, an RDMA queue pair is a full duplex facility, which means that each of the computers 102 and 104 act as both a producer and a consumer. This allows for an optimization. If there is a payload message to be sent from the producer on one computer (e.g., 102 or 104), it can be combined with a header buffer flow control message to be sent from the consumer on the same computer (e.g., 102 or 104, respectively).

The header buffer index values—which can, for example, range from 0 to 1023—require, for example, only 10 bits. The number of bits, which is 10 bits in this example, must be 16 or less. So, the header buffer write index of the producer and the header buffer read index of the consumer can be put in one 32 bit immediate value. Both values can simply always be sent on all WRITE_WITH_IMM messages. If no new payload message was sent by the producer or no new message was processed by the consumer, the respective value is just identical to the value sent before.

Figure 4:
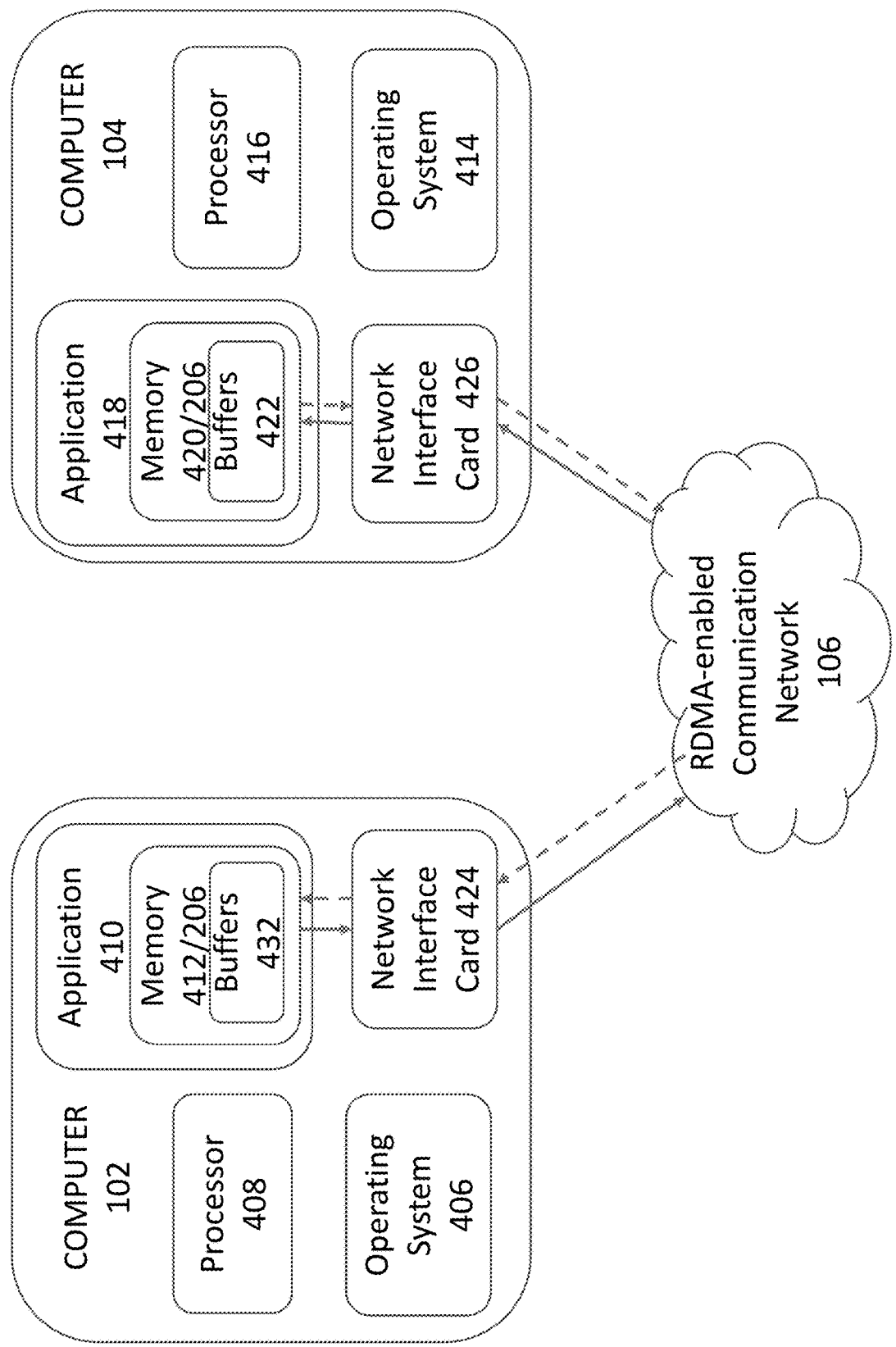
FIG. 4 illustrates architectural details of two computers communicatively coupled via the RDMA-enabled communication network, in accordance with some implementations of the subject matter described herein.

FIG. 4 illustrates architectural details of two computers 102 and 104 communicatively coupled via the RDMA-enabled communication network 106. The first computer 102 can include a first operating system 406, a first processor 408, and a first application 410. The first application 410 can include a first memory 412 (which is also referenced using reference numeral 206). The second computer 104 can include a second operating system 414, a second processor 416, and a second application 418. The second application 418 can include a second memory 420 (which is also referenced using reference numeral 206). The second memory 420 can include multiple buffers 422. The first application 410 can remotely manage the memory 420 without involving either the first operating system 406 or the second operating system 414.

The first computer 102 can further include a first network interface card 124. The second computer 104 can further include a second network interface card 426. The first application 410 can communicate with the second application 418 via the first network interface card 424 and the second interface card 426. The first network interface card 424 can communicate with the second network interface card 426 via the RDMA-enabled communication network 106.

To remotely manage memory 420 of the second computer 104, the first computer 102: (a) identifies free or available buffers amongst the multiple buffers 422, and (b) informs the computer 504 about the specific buffer within the buffers 422 that the producer computer 102 actually used.

To identify free or available buffers amongst the multiple buffers 422, the following tasks are performed. The computer 104 registers the buffers 422 on behalf of the computer 102 and informs the computer 102 about the metadata the computer 102 needs to write to them via WRITE_WITH_IMM. As soon as the computer 104 has completed using a buffer 422, the computer 104 again informs the computer 102 that the buffer 422 is available for writing again. This way the computer has at any time a consistent understanding of the buffers 422 that are currently free to be used for WRITE_WITH_IMM. The computer 102 takes care of various aspects of buffer management, such like avoiding fragmentation.

To inform the computer 104 about the specific buffer within the buffers 422 that the producer computer 102 actually used, the immediate value of WRITE_WITH_IMM is used as index into the header buffers within the buffers 422.

Further, the overflow of the completion queue—of the RDMA connection between the computer 102 and the computer 104—can be prevented as follows. The header buffer write index 304 used by the computer 102 is sent to the computer 104. The header buffer read index 306 processed by the computer 104 is sent back to the computer 102. The computer 102 blocks (i.e., stops) sending another message to the computer 104 if the header buffer 422 to be used is not yet signaled as processed by the computer 104, thereby controlling the flow. Further, to prevent overflow of the completion queue, the only data the computer 104 sends to the computer 102 is the index—which can have a range from 0 to 1023—of the most recently processed header buffer 302. This data is sent as 32 bit immediate value of WRITE_WITH_IMM without any scatter/gather entry so header buffer 302 of the consumer computer 104 is not used.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatuses, methods, and/or articles. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   a first computer comprising a first operating system; and
   a second computer communicatively coupled to the first computer via a remote direct memory access enabled communication network, the second computer comprising a second operating system and a second memory, the second memory comprising a plurality of buffers,
   the first computer remotely managing the plurality of buffers of the second memory of the second computer without involving either the first operating system or the second operating system, the managing further comprising:
      the first computer identifying available buffers amongst the plurality of buffers, the identifying based at least in part on the second computer registering the plurality of buffers with the first computer and informing the first computer of an availability to write to the plurality of buffers,
      in response to the registration, the first computer configured to write, using a first write message and a second write message, to the second computer via the remote direct memory access, the first write message writing user content data via the remote direct memory access to a payload buffer of the plurality of buffers at the second computer, the second write message comprising a Write with IMM, to a header buffer of the plurality of buffers, the Write with IMM including a first immediate value indicating a location in the header buffer that contains an address and an offset to a second location in the payload buffer of the plurality of buffers, the second location configured to store payload data comprising the user content data, wherein the second write message informs, via the write to the header buffer, the second computer of the second location in the payload buffer being used by the first computer, and wherein after the write, the first computer is configured to receive, via another corresponding Write with IMM from the second computer, second data specifying a read index processed by the second computer to prevent an overflow condition.

2. The system of claim 1, wherein:
   the first computer further comprises a first network interface card;
   the second computer further comprises a second network interface card; and
   the first computer communicates with the second computer via the first network interface card and the second interface card.

3. The system of claim 2, wherein the first network interface card communicates with the second network interface card via the communication network.

4. The system of claim 1, wherein the first immediate value serves as an index into the header buffer.

5. The system of claim 1, wherein the first computer and the second computer are configured to prevent, based on the read index, the overflow condition in a communication queue of a connection between the first computer and the second computer.

6. The system of claim 1, wherein:
the first computer further comprises a first memory;
the first memory comprises another plurality of buffers; and
the second computer remotely manages the other plurality of buffers without involving either the first operating system or the second operating system, the remote management by the second computer comprising the second computer identifying another plurality of available buffers amongst the other plurality of buffers.

7. A method comprising:
registering, by a consumer computer, a plurality of buffers within a consumer memory located within the consumer computer, the consumer computer registering the plurality of buffers on behalf of a producer computer communicatively coupled to the consumer computer via a communication network;
determining, by the consumer computer, whether a buffer of the plurality of buffers is available to be written in; and
transmitting, by the consumer computer to the producer computer, data specifying the buffer is available to be written in, the data transmitted, as an immediate value of the Write with IMM; and
receiving, via the remote direct memory access, a first write message and a second write message, the first write message writing user content data via the remote direct memory access to a payload buffer of the plurality of buffers at the second computer, the second write message comprising a Write with IMM including a first immediate value indicating indicating a location in the header buffer that contains an address and an offset to a second location in the payload buffer of the plurality of buffers, the second location configured to store payload data comprising the user content data, wherein the second write message informs, via the write to the header buffer, the second computer of the second location in the payload buffer being used by the first computer, and wherein after the write, the first computer is configured to receive, via another corresponding Write with IMM from the second computer, second data specifying a read index processed by the second computer to prevent an overflow condition.

8. The method of claim 7, wherein the communication network is a remote direct memory access enabled communication network.

9. The method of claim 7, wherein:
the producer computer further comprises a first network interface card;
the consumer computer further comprises a second network interface card; and
the producer computer communicates with the consumer computer via the first network interface card and the second interface card.

10. The method of claim 9, wherein the first network interface card communicates with the second network interface card via the communication network.

11. The method of claim 7, wherein the producer computer and the consumer computer are configured to prevent an overflow in a communication queue of a connection between the producer computer and the consumer computer.

* * * * *